United States Patent
Aoyagi et al.

(10) Patent No.: US 6,903,890 B2
(45) Date of Patent: Jun. 7, 2005

(54) METHOD AND APPARATUS FOR WRITE COMPENSATION OF PERPENDICULAR MAGNETIC RECORDING IN DISK DRIVE

(75) Inventors: Yuka Aoyagi, Ome (JP); Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 358 days.

(21) Appl. No.: 10/097,327

(22) Filed: Mar. 15, 2002

(65) Prior Publication Data

US 2002/0135920 A1 Sep. 26, 2002

(30) Foreign Application Priority Data

Mar. 23, 2001 (JP) ........................................ 2001-085819

(51) Int. Cl.[7] .............................................. G11B 5/09
(52) U.S. Cl. .......................................... 360/45; 360/53
(58) Field of Search ............................. 360/31, 55, 46, 360/67, 68, 40, 44, 45; 369/59.22

(56) References Cited

U.S. PATENT DOCUMENTS

| | | | | |
|---|---|---|---|---|
| 5,206,853 A | * | 4/1993 | Tanaka ..................... | 369/53.33 |
| 5,258,876 A | * | 11/1993 | Danner et al. ................ | 360/45 |
| 5,530,600 A | * | 6/1996 | Shrinkle ...................... | 360/45 |
| 5,594,377 A | | 1/1997 | Choi et al. | |
| 5,872,665 A | | 2/1999 | Millican et al. | |
| 5,963,385 A | | 10/1999 | Takada et al. | |
| 6,038,093 A | | 3/2000 | Takada et al. | |
| 6,452,736 B1 | * | 9/2002 | Saiki et al. ................... | 360/46 |

FOREIGN PATENT DOCUMENTS

| | | |
|---|---|---|
| JP | 7-134804 | 5/1995 |
| JP | 11-86213 | 3/1999 |
| JP | 11-219503 | 8/1999 |
| JP | 2000-207704 | 7/2000 |

* cited by examiner

*Primary Examiner*—David Hudspeth
*Assistant Examiner*—Daniell L. Negrón
(74) *Attorney, Agent, or Firm*—Pillsbury Winthrop, LLP (57) ABSTRACT

There is disclosed a write compensator which suppresses bit shift caused by distortion of a read signal waveform of a read head in a disk drive adopting a perpendicular magnetic recording system. The write compensator executes write compensation during recording data based on the known relationship between bit shift which is beyond an allowable range and a pattern of a data bit string of a data signal. A write amplifier converts the write-compensated data signal into an electrical signal by using the write compensator so as to suppress the bit shift, and supplies it to a write head.

15 Claims, 7 Drawing Sheets

METHOD AND APPARATUS FOR WRITE COMPENSATION OF PERPENDICULAR MAGNETIC RECORDING IN DISK DRIVE

CROSS-REFERENCE TO RELATED APPLICATIONS

This application is based upon and claims the benefit of priority from the prior Japanese Patent Application No. 2001-085819, filed Mar. 23, 2001, the entire contents of which are incorporated herein by reference.

BACKGROUND OF THE INVENTION

1. Field of the Invention

The present invention generally relates to the file of disk drives adopting a perpendicular magnetic recording system, and more particularly to a write compensation facility when recording data on a disk.

2. Description of the Related Art

In recent years, in a disk drive field as typified by a hard disk drive, a disk drive adopting a perpendicular magnetic recording method has attracted attention as a technique for exceeding a limit in recording density in a longitudinal magnetic recording method.

In the perpendicular magnetic recording system, when digital data (0/1) is recorded on a disk which is a storage medium, a magnetization area corresponding to the data is formed in the perpendicular direction (depth direction). In the data read operation, an amplitude of a read signal waveform 51 output from a read head is, as shown in FIG. 5B varies at a magnetic transition position 52, and this signal has a rectangular signal waveform that the amplitude corresponds to the direction of magnetization.

Figure 5A:
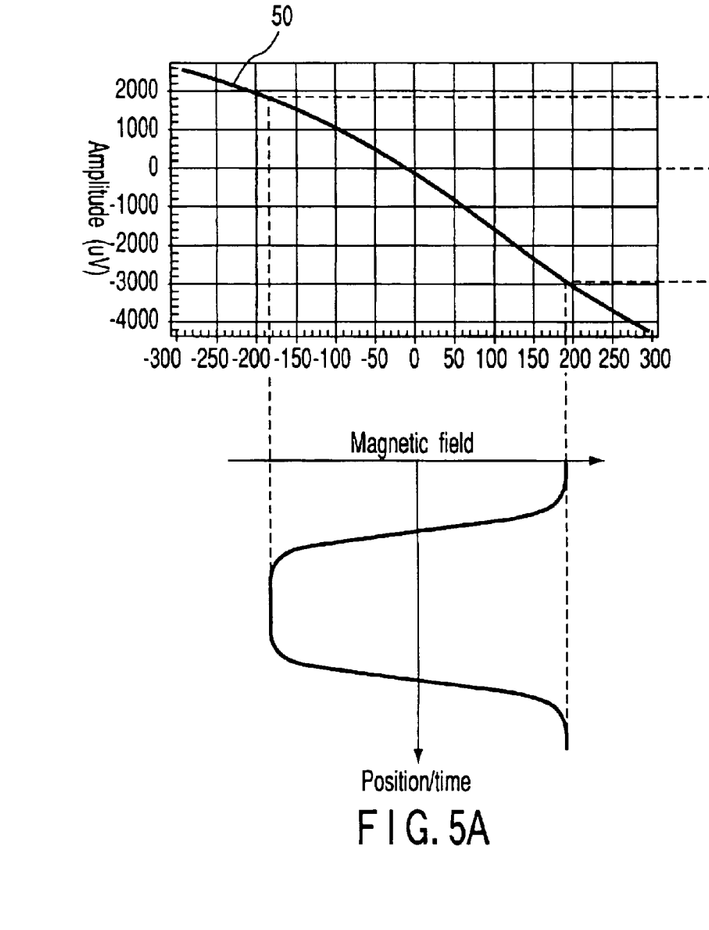
FIGS. 5A to 5C are views for illustrating the relationship between a reproduction characteristic of a read head and bit shift in a prior art.
Figures 5B, 5C:
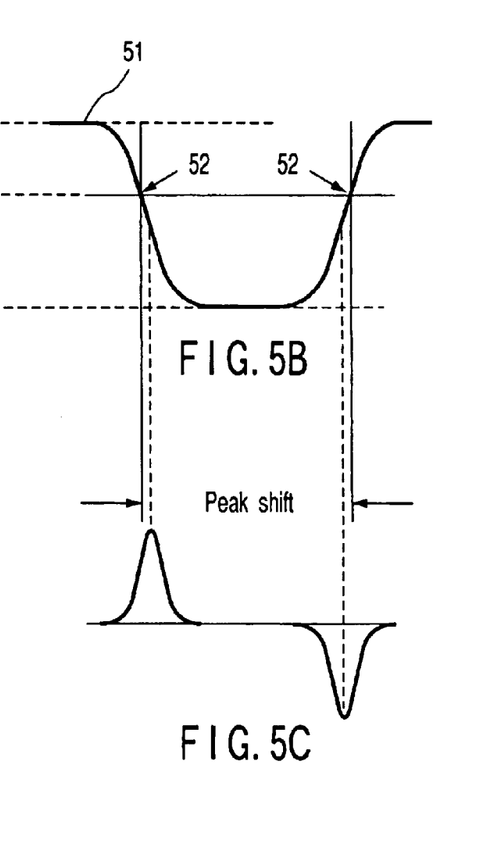

Usually, in the disk drive adopting the perpendicular magnetic recording method, the read signal obtained by the read head is, as shown in FIG. 5C, converted into a differential waveform by a differential circuit. This differential waveform ideally has a maximum amplitude at the magnetic transition position 52. Thus, there can be obtained signals (1/0) having different amplitude polarities in accordance with transition from the differential waveform, from magnetization in the positive direction into magnetization in the negative direction, and from magnetization in the negative direction into magnetization in the positive direction.

In recent disk drives, there is adopted a magnetic head in which a read head and a write head are separately mounted on a slider. In the disk drive adopting the perpendicular magnetic recording method, the read head is usually a head consisting of a GMR (giant magnetoresistive) element, as similar to the drive for longitudinal magnetic recording.

On the other hand, the write head is usually a single pole type head.

Meanwhile, in the perpendicular magnetic recording type disk drive, as shown in FIG. 5A, it is known that a non-linear distortion is generated as a reproduction saturation characteristic in a GMR element of the read head. A waveform distortion, therefore, exists in the read signal waveform output from the read head. In the data reproduction operation, as described above, the read signal waveform is converted into a differential waveform by the differential circuit. At that time, as shown in FIG. 5C, there occurs a phenomenon called bit shift that a peak position of the differential waveform shifts. In short, the bit shift due to a distortion of the read signal waveform occurs in the perpendicular magnetic recording type disk drive. When the bit shift which is beyond an allowable range occurs, this can be a factor of occurrence of a read error that data can not be normally restored.

Incidentally, since the non-linear distortion of the read head occurs as the vertical asymmetry property of the read signal waveform in the longitudinal magnetic recording type disk drive, the bit shift phenomenon due to this distortion does not have to be taken into consideration.

Figures 6, 7A, 7B, 7C:
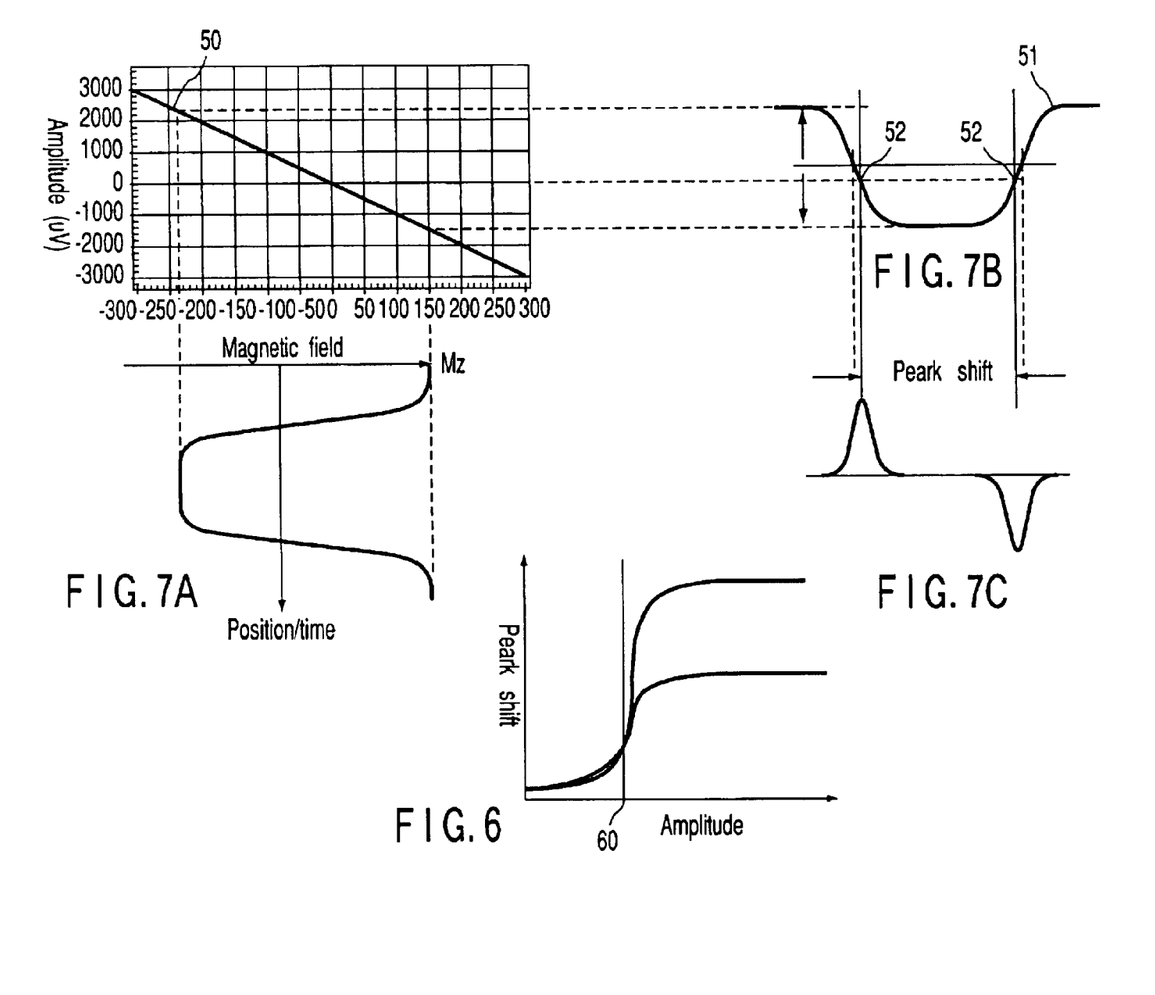
FIG. 6 is a view showing the relationship between the bit shift and an output value of a read signal in the prior art.
FIGS. 7A to 7C are views for illustrating bit shift according to a modification of the embodiment.

FIG. 6 is a view showing the relationship between an output (amplitude) of a read signal during the read operation and the bit shift (peak shift). That is, although a quantity of bit shift differs depending on an output value of the read signal, this quantity exponentially drops at a given output value or smaller values (threshold value 60). In other words, in the MR reproduction saturation characteristic 50 of the read head shown in FIG. 5A, when a response range (range of amplitude values) becomes large, the influence of the non-linear distortion is increased. Conversely, when the response range is small (when 0 is a center, a range in the vicinity thereof), the characteristic can be considered as a substantially linear characteristic. To sum up, in a data bit string of a data signal to be processed (read/write data), it is confirmed that the bit shift is apt to occur in the read signal waveform (differential waveform) when its bit interval is long. Here, usually, assuming that a bit "1" is a reference, the bit interval is determined by a number of bits "0" generated between this bit and a next bit "1". In other words, when a data signal has a data pattern which is a 3T or above pattern, the bit shift is apt to occur in the read signal (differential waveform). On the other hand, in the case of a pattern which is less than the 3T pattern, it is confirmed that the bit shift is contrary hard to be generated.

Basically, in the perpendicular magnetic recording type disk drive, since there occurs the bit shift due to the non-linear distortion generated in the read signal waveform output from the read head, a write compensation facility is required in order to solve this problem.

As a prior art, there is proposed a compensation method by which an inversion position at which generation of the non-linear bit shift is expected is detected in advance and this inversion position is shifted in the reverse direction of the non-linear bit shift (for example, see Jpn. Pat. Appln. KOKAI Publication No. 2000-207704). Further, in order to eliminate the bit shift due to remaining magnetization in the history, there is proposed a compensation method by which a demagnetization function is provided to the head (for example, see Jpn. Pat. Appln. KOKAI Publication No. 7-134804, U.S. Patent Publication U.S. Pat. No. 5,963,385, and U.S. Patent Publication U.S. Pat. No. 6,038,093). Furthermore, there is also proposed a compensation method which eliminates the bit shift due to magnetization in the history by performing direct-current deletion immediately before recording (for example, see Jpn. Pat. Appln. KOKAI Publication No. 11-86213).

However, all of the above methods are methods for compensating the bit shift due to recording. Therefore, as described above, it is impossible to compensate the bit shift generated based on the reproduction characteristic of the read head and the bit interval of the data bit string of the data signal.

BRIEF SUMMARY OF THE INVENTION

It is an object of the present invention to realize a write compensation facility which can compensate for the bit shift due to distortion generated in a read signal waveform from a read head in a perpendicular magnetic recording type disk drive.

In accordance with one aspect of the present invention, there is provided a disk drive including facilities to write compensation of perpendicular magnetic recording. The disk drive comprises:

a disk capable of magnetically recording a data signal by a perpendicular magnetic recording method;

a head which includes a write head to write the data signal onto the disk and a read head to read the data signal from the disk;

a write compensator which executes write compensation in order to suppress the bit shift based on a predetermined relationship between bit shift due to a distortion in a read signal waveform from the read head and a data bit string of the data signal; and a data recording device which records the data signal write-compensated by the write compensator onto the disk by using the write head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A preferred embodiment according to the present invention will now be described hereinafter with reference to the accompanying drawings.

(Structure of Disk Drive)

Figure 1:
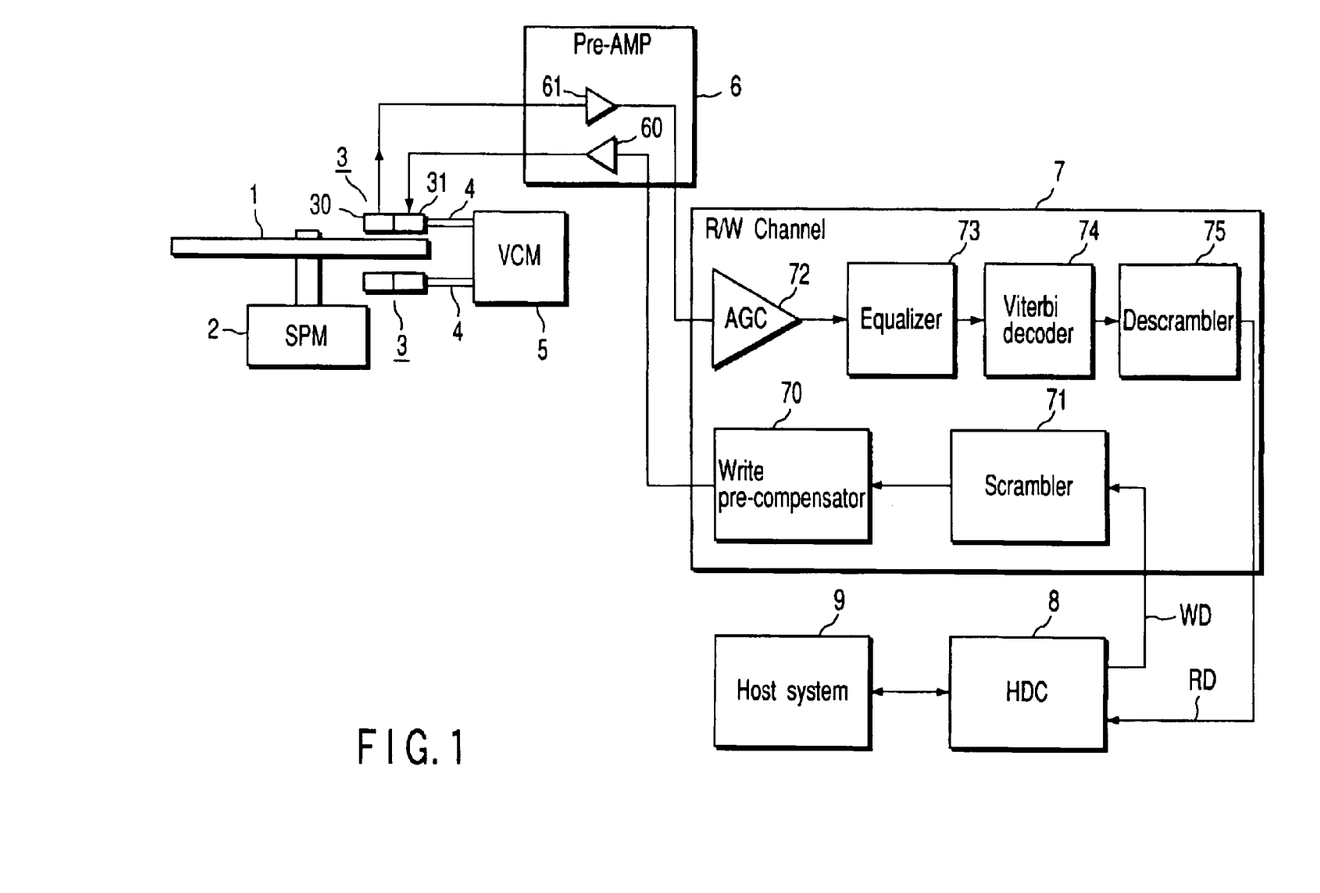
FIG. 1 is a block diagram showing a primary part of a disk drive adopting a perpendicular magnetic recording system according to an embodiment.

This disk drive records data onto a disk 1 by a perpendicular magnetic recording method. As shown in FIG. 1, the disk drive broadly has a disk 1 which is a data recording medium, a spindle motor (SPM) 2, a head assembly, a data signal processing system, and a disk controller (HDC) 8. The disk 1 is fixed to the SPM 2 and rotated at high speed.

The head assembly includes a magnetic head 3, an actuator 4, and a voice coil motor (VCM) 5. The VCM 5 is a motor for moving the actuator 4 in the radial direction on the disk 1.

The magnetic head 3 is a head in which a read head 30 and a write head 31 are separated and mounted on the slider. The read head 30 is a read-only head for reading data from the disk 1, and usually consists of a GMR element. The write head 31 is usually a single pole type head suitable for perpendicular magnetic recording. The write head 31 generates a recording magnetic field corresponding to an electric current supplied from a write amplifier 60, and performs perpendicular magnetic recording of a data signal as a recording target onto the disk 1.

The HDC 8 constitutes the interface between the disk drive and a host system 9, and has functions to receive a recording data signal from the host system 9 and to transfer a reproduction data signal (RD) to the host system 9.

The data signal processing system is roughly constituted by a pre-amplification circuit 6 and a read/write channel (data channel) 7. The pre-amplification circuit 6 has a read amplifier 61 and a write amplifier 60. The read amplifier 61 amplifies a data signal read by the read head 30 and transmits it to the read/write channel 7. The write amplifier 60 converts the data signal supplied from the read/write channel 7 into a write electric current and transmits it to a write head 31.

The read/write channel 7 is a PRML (partial response maximum likelihood) type signal processing circuit which consists of a read channel system and a write channel system and processes recording and reproduction data signals. The read channel system has an AGC amplifier 72, an equalizer 73, a Viterbi decoder 74, and a descrambler 75.

The AGC amplifier 72 has an AGC (automatic gain control) function and maintains a level of the read data signal constant. The equalizer 73 is a digital signal processing circuit which includes a low-pass filter, an analog-to-digital converter and a digital waveform equalizer (digital filter) and others. The descrambler 75 has a function to return the recording data signal (WD) randomized by a scrambler 71 in the write channel system to original recording data.

The write channel system broadly has a scrambler 71 and a write pre-compensator 70. The scrambler 71 is a circuit which randomizes the recording data signal WD from the HDC 8 and usually consists of an exclusive OR circuit. The write pre-compensator 70 executes, as will be described later, the compensation operation for bit shift due to a reproduction characteristic of the read head 30. It is to be noted that the write channel system includes a pre-coder which is a circuit for giving PR (partial response) equalization and interference of the reverse characteristic, and others.

(Write Pre-compensator)

Figure 2:
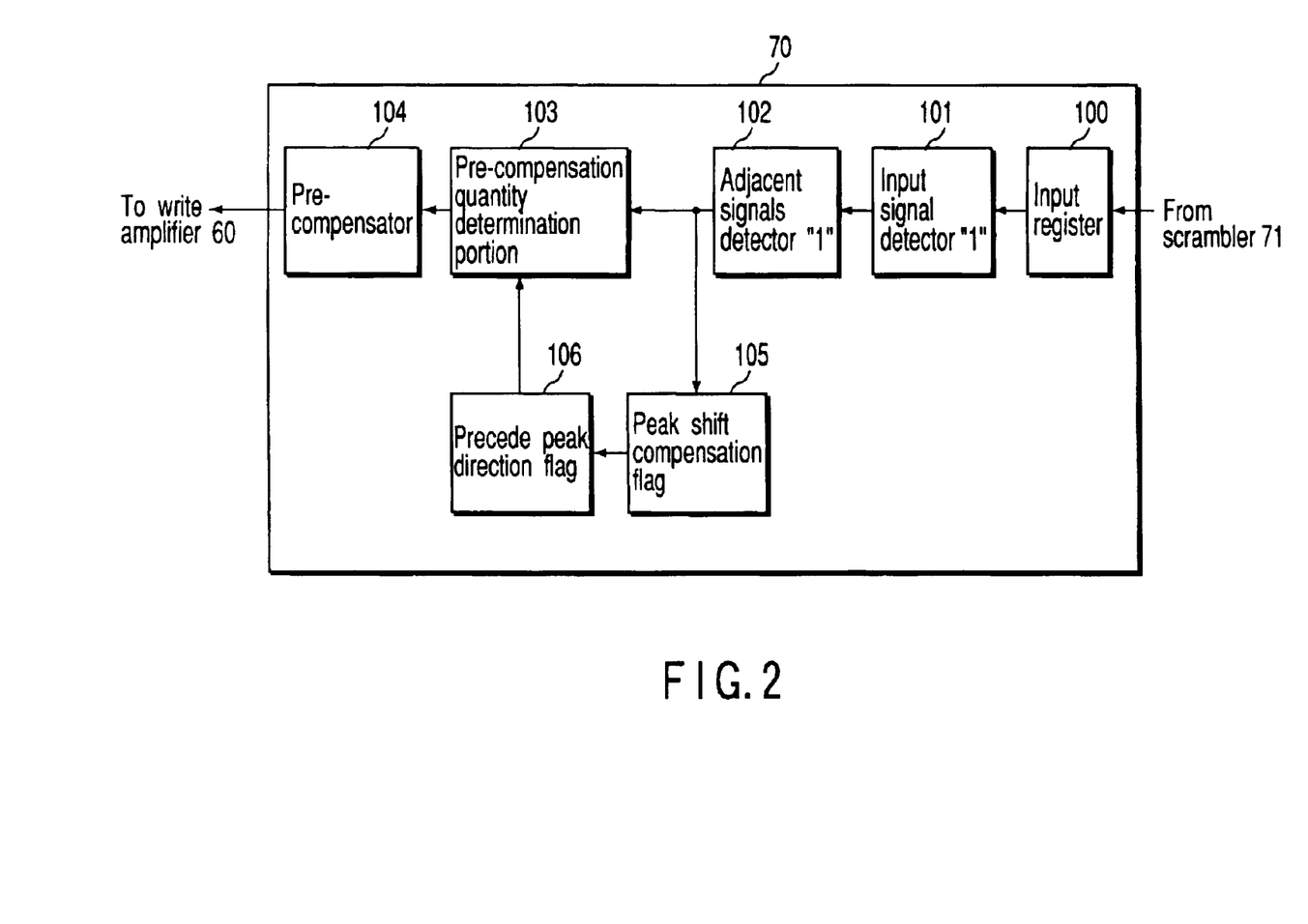
FIG. 2 is a block diagram for illustrating a structure of a write compensator according to the embodiment.

As shown in FIG. 2, the write pre-compensator 70 has an input register 100, an input signal detection portion 101 which detects a bit "1" as a reference, an adjacent signals detection portion 102 which detects adjacent bits "1" with respect to the reference bit, a precompensation quantity determination portion 103, a precompensation execution portion 104, a peak shift compensation flag storage portion 105, and a precedent peak direction flag storage portion 106.

The adjacent signals detection portion 102 has a counter for detecting a data pattern (data bit string) with respect to the reference bit as will be descried later. The precompensation quantity determination portion 103 determines a bit shift (peak shift) compensation quantity (including a shift direction) which is a write compensation quantity. In the case of a data bit string of a bit interval with which occurrence of bit shift beyond an allowable range due to a non-linear distortion of the reproduction characteristic of the read head 30 can be presumed, the peak shift compensation flag storage portion 105 sets a peak shift compensation flag (CF=1). This data bit string corresponds to a data pattern equal to or above the 3T pattern.

The precedent peak direction flag storage portion 106 sets a flag (PF) used for making judgment upon whether the precedent peak is plus or minus, and determines a shift direction (preceding direction or delaying direction) when executing precompensation.

(Write Precompensation Operation)

The Write precompensation operation according to this embodiment will now be described hereinafter with reference to FIGS. 1 to 3 and FIGS. 4A to 4F.

In the data recording operation, when the HDC 8 receives a recording data signal WD to be recorded on the disk 1 from the host system 9, it first transmits it to the read/write channel 7. In the write channel in the read/write channel 7, the scrambler 71 executes randomization processing (randomization) so that a biased bit pattern which may result in a reproduction error is not generated. Thereafter, the data signal as a recording target is supplied from the scrambler 71 to the write precompensator 70 according to this embodiment. Here, the data signal is, for example, (1, 6) RLL (run length limited) encoded data, and a case that a maximum run length (maximum number of continuous bits) is five bits is presumed.

Figure 4A:
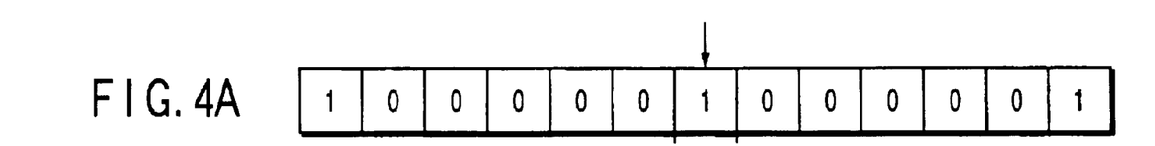
FIGS. 4A to 4F are views showing examples of a data bit string for illustrating the write compensation operation according to the embodiment.
Figure 4B:
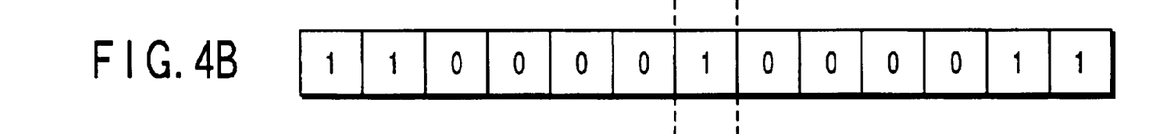
Figures 4C, 4D:
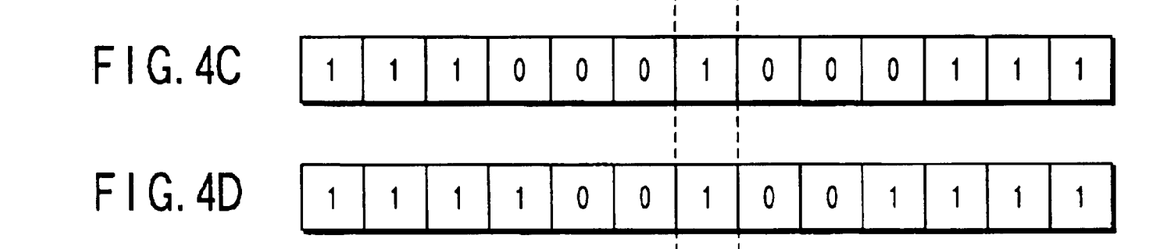
Figure 4E:
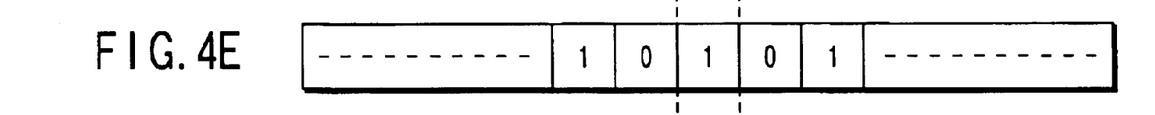
Figure 4F:
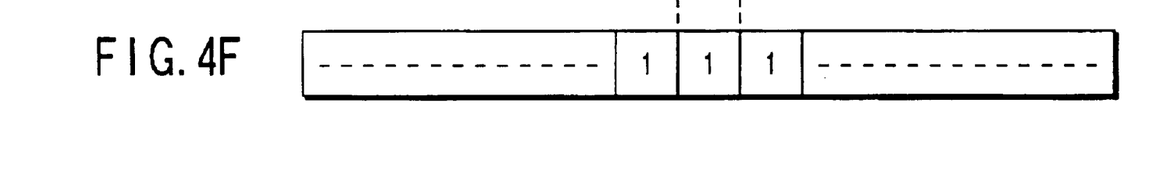

Here, as shown in FIG. 4F, with a signal having a bit "1" indicated by an arrow (later-described reference bit) being determined as a reference, a data pattern in which all bits are "1" is represented as a 1T pattern. The 1T pattern is a pattern of a maximum frequency and shows a minimum amplitude value as a reproduction response characteristic of the read head 30.

On the other hand, as shown in FIG. 4A, a data pattern in which "0" of five bits are continuously provided between bits "1" is represented as a 6T pattern. This 6T pattern means a cycle signal which is ⅙ of the maximum frequency, and shows a maximum amplitude value as the reproduction response characteristic of the read head 30. As shown in FIGS. 4B to 4E, a 5T pattern, a 4T pattern, a 3T pattern, a 2T pattern are likewise presented.

In the write precompensator 70, six bits of the data signal transmitted from the scrambler 71 is held in the input register 100 in time series (step S1). The input signal detection portion 101 detects the reference bit "1" used for writing magnetic transition in magnetic recording from the input register 100 (step S2). This reference bit "1" is a bit "1" indicated by an arrow in FIGS. 4A to 4F.

Figure 3:
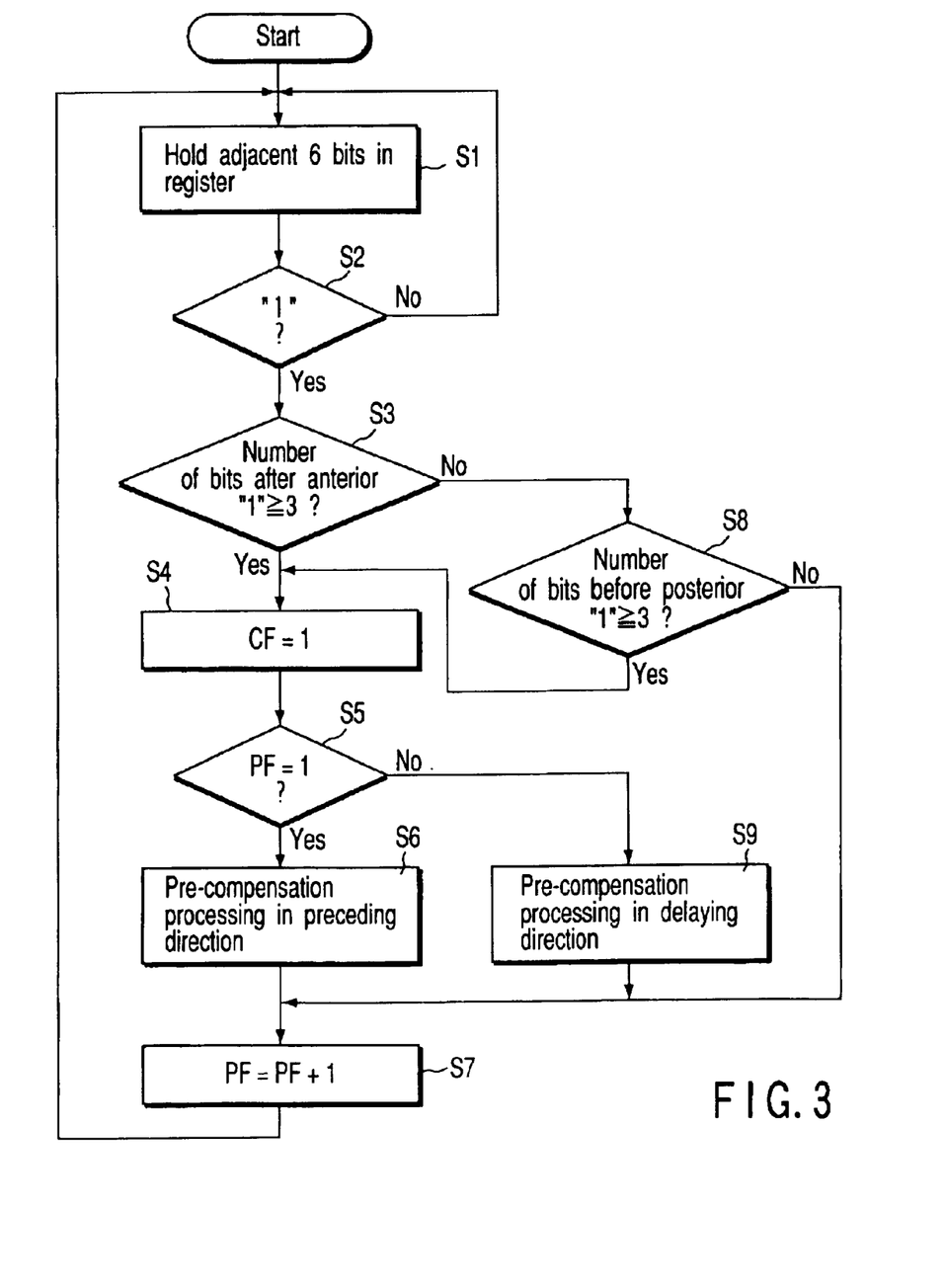
FIG. 3 is a flowchart for illustrating the procedure of the write compensation operation according to the embodiment.

When the reference bit "1" is detected, the adjacent signals detection portion 102 counts a number of bits "0" after the most recently recorded bit "1" and a number of bits "0" before the bit "1" of the next data signal, and detects a data bit string (data pattern) which requires bit shift (peak shift) compensation (step S3).

Here, in the data bit string (data pattern) of the data signal, the recording density (which means the recording density of user data UD) is low as a pattern has more number of bits "0" before and after the bits "1". In this case, the amplitude value output from the read head 30 becomes high. It is to be noted that the read signal frequency from the read head 30 differs depending on the recording density (UD). In this embodiment, as an output threshold value which requires bit shift (peak shift) compensation, an output amplitude value at the time of the 3T pattern as a data pattern is presumed (see FIG. 6). That is, when the data pattern of the data signal is less than the 3T pattern, it is determined that the bit shift due to reproduction is within an allowable range, and precompensation (bit shift compensation) is not executed. Conversely, in case of data patterns equal to or above the 3T pattern shown in FIGS. 4A to 4D, precompensation is executed.

In the write precompensator 70, when the data pattern for six bits of the data signal is below the 3T pattern, the adjacent signals detection portion 102 adds "1" to a flag (PF) of the precedent peak direction flag storage portion 106 (NO at the step S3, NO at the step S8, and the step S7). Here, since the input signal "1" is detected, "1" is added to the flag (PF), and the control advances to the subsequent bit detection processing. It is to be noted that the flag (PF) is expressed by "1" and "0".

On the other hand, if the preceding or following data pattern is equal to or above the 3T pattern, a flag (CF=1) is set in the peak shift compensation flag storage portion 105 (YES at the step S3 or YES at the step S8, and the step S4). When the compensation flag (CF=1) is set, the precompensation quantity determination portion 103 determines the precompensation processing in the preceding direction or the delaying direction in accordance with the precedent peak direction flag (PF) (step S5). That is, judgment is made upon whether the precedent peak is plus or minus based on the precedent peak direction flag (PF). In the case of plus, the precompensation execution portion 104 executes precompensation (bit shift compensation) in the preceding direction in time (step S6). Moreover, in the case of minus, the precompensation portion 104 executes precompensation (bit shift compensation) in the delaying direction in time (step S9). Incidentally, as to the precompensation quantity (bit shift quantity) and the direction, the precompensation quantity determination portion 103 changes the precompensation quantity to plus or minus at the time of manufacture of the disk drive, thereby setting an optimum precompensation quantity.

As described above, in the case of the data bit string in which bit shift (peak shift) due to the reproduction characteristic of the read head 30 is beyond an allowable range (that is, the data pattern equal to or above the 3T pattern), the write precompensator 70 according to this embodiment executes the bit shift compensation processing in the preceding direction or the delaying direction. Specifically, in the case of the data pattern equal to or above the 3T pattern that a response range (range of amplitude values) of the read head 30 becomes large in particular, precompensation (write compensation) which carries out bit shift (peak shift) in the reverse direction is executed when writing the data so as to cancel out the peak shift during data reproduction. As a result, in the perpendicular magnetic recording system, the bit shift due to reproduction of the read head 30 using the GMR element can be compensated, thereby realizing improvement in reproduction error rate. It is to be noted that the regular write compensation can be simultaneously executed with the bit shift compensation according to this embodiment. In addition, in the case of the data pattern being less than the 3T pattern, since a response range of the read head is narrow (when 0 is the center, a range in the vicinity thereof) and it can be regarded as a substantially linear characteristic, write compensation is not executed.

(Modification)

FIGS. 7A to 7C and FIG. 8 are views concerning a modification according to this embodiment.

As shown in FIG. 7A, this modification concerns the method of write compensation (bit shift compensation) with respect to a data pattern with which peak shift is apt to occur even if the reproduction saturation characteristic 50 of the read head 30 is a substantially linear characteristic and non-linear distortion is not observed.

The data pattern with which peak shift tends to occur is a pattern in which a peak position defers depending on a degree of saturation before and after the data signal, and this is a pattern in which numbers of continuous bits (numbers of continuous bits "0") are different from each other in the preceding and following directions.

Figure 8:
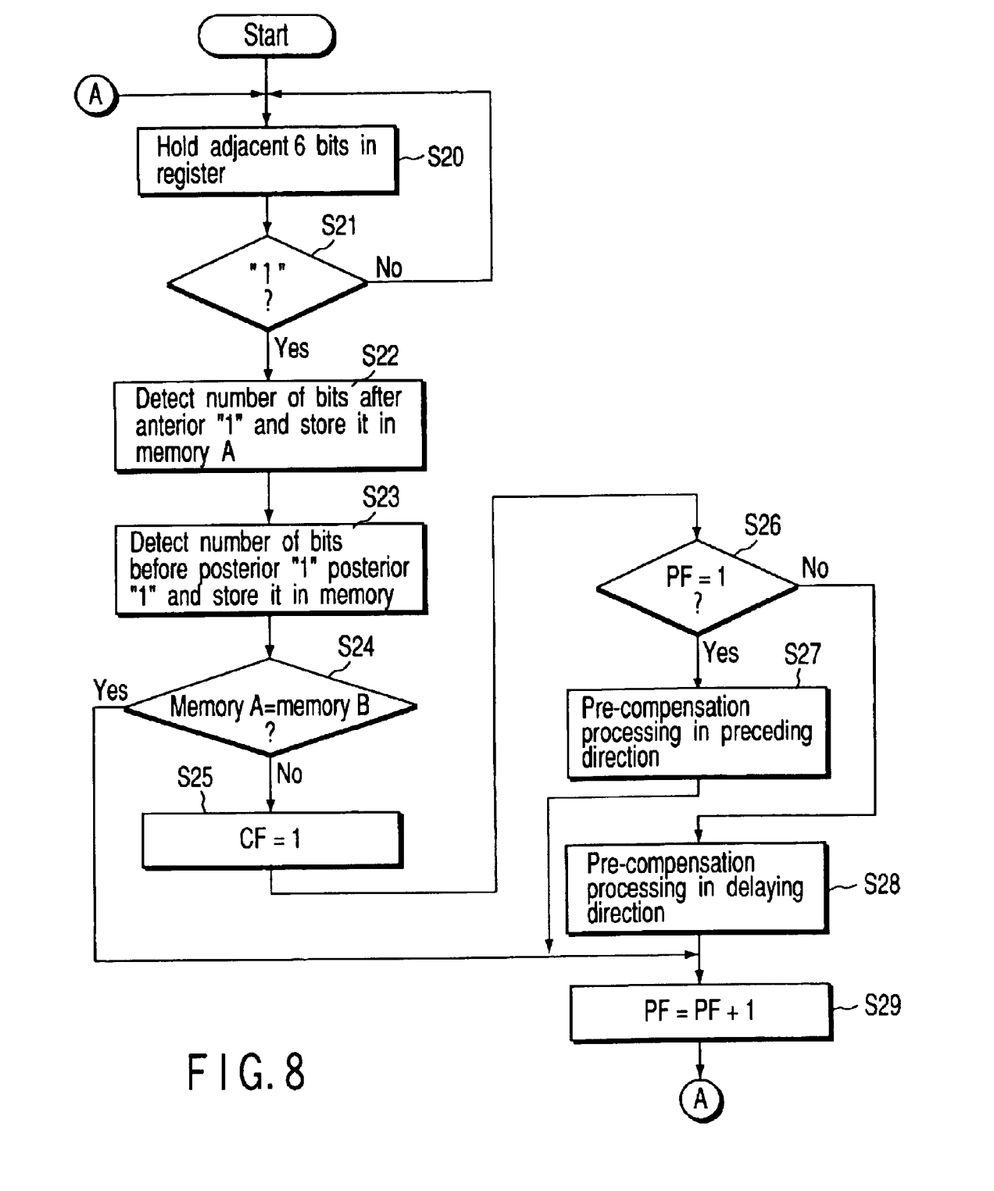
FIG. 8 is a flowchart for illustrating the procedure of the write compensation operation according to the modification of the embodiment.

The write compensation operation according to this modification will now be described hereinafter with reference to the flowchart of FIG. 8.

At first, as similar to the embodiment, in the write precompensator 70, a data signal for six bits transmitted from the scrambler 71 is held in the input register 100 in time series (step S20). The input signal detection portion 101 detects a reference signal "1" used for writing the magnetic transition in magnetic recording from the input register 100 (step S21).

When the reference signal "1" is detected, the adjacent signals detection portion 102 counts a number of bits "0" after the most recently recorded signal "1" and a number of bits "0" before the signal "1" of the next data signal, and stores each number of bits in a memory A and a memory B, respectively (steps S22 and S23). The adjacent signals detection portion 102 makes judgment upon whether a number of continuous bits "0" preceding the reference signal "1" is equal to a number of continuous bits "0" following the reference signal "1" (step S24).

In the case of a data pattern in which the number of preceding continuous bits "0" is different from that of the following continuous bits "0", a flag (CF=1) is set in the peak shift compensation flag storage portion 105 (NO at the step S24, and the step S25). When the compensation flag (CF=1) is set, the precompensation quantity determination portion 103 determines the precompensation processing in the preceding direction or the delaying direction in accordance with the precedent peak direction flag (PF) (step S26). That is, judgment is made upon whether the preceding peak is plus or minus based on the precedent peak direction flag (PF). In the case of plus, the precompensation execution portion 104 executes precompensation (bit shift compensation) in the direction which precedes in time (step S27). Further, in the case of minus, the precompensation execution portion 104 executes precompensation (bit shift compensation) in the direction which delays in time (step S28).

As described above, according to this modification, even if a substantially linear property is assured and non-linear distortion is not observed in the reproduction characteristic of the read head 30, bit shift compensation is executed in the case of an anteroposterior asymmetric data pattern in which the number of continuous bits "0" preceding the reference bit "1" is different from the number of continuous bits "0" following the reference bit "1". Therefore, the bit shift caused due to reproduction of the read head can be compensated. Thus, a reproduction error rate in the data reproduction operation can be improved.

In short, even if the substantially linear property is assured and the non-linear distortion is not observed in the reproduction characteristic of the read head 30, the precompensator 70 according to this modification executes write compensation which is bit shift compensation. A concrete condition for this case is an anteroposterior asymmetric data pattern in which the number of continuous bits "0" preceding the reference bit "1" is different from the number of continuous bits "0" following the same.

As described above in detail, according to this embodiment and the modification, when recording the data signal onto the disk in the disk drive adopting the perpendicular magnetic recording system, write compensation for suppressing the bit shift can be realized with respect to the data bit string (data pattern) in which the bit shift tends to occur during data reproduction. Therefore, the read error rate during data reproduction can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
    a disk capable of magnetically recording a data signal by a perpendicular magnetic recording;
    a head including a write head to write the data signal onto said disk and a read head to read the data signal from said disk;
    a write compensator that performs write compensation to suppress bit shift based on a predetermined relationship between the bit shift caused by a distortion of a read signal waveform from said read head and a data bit string of said data signal; and
    a data recording device that records the write compensated data signal onto said disk by said write head.

2. The disk drive according to claim 1, wherein said write compensator detects a data bit string in which said bit shift occurs beyond an allowable range for each predetermined number of bits of said data signal, and performs said write compensation with respect to said data signal of said data bit string.

3. The disk drive according to claim 1, wherein said data recording device includes an amplification circuit that converts said write compensated data signal into an electrical signal and supplies it to said write head.

4. The disk drive according to claim 1, wherein said write compensator detects a data bit string at each bit interval corresponding to a number of continuous bits "0" with a bit "1" of said data signal as a reference, performs write compensation when, in said detected data bit string, said bit interval is a data bit string which exceeds a preset reference value, and does not perform said write compensation when the same is less than said reference value.

5. The disk drive according to claim 4, wherein a bit "1" of said data signal is determined as a reference, and said write compensator performs write compensation when a bit interval corresponding to a number of continuous bits "0" in either the preceding or following direction is a data bit string which exceeds said reference value, and determines a bit shift direction in said write compensation in accordance with either said preceding or following direction.

6. The disk drive according to claim 4, wherein when a data pattern of said data bit string having a maximum frequency is determined as a 1T pattern, said write compensator performs write compensation with respect to a data signal indicative of a data bit string which is equal to or above a 3T pattern.

7. The disk drive according to claim 1, wherein when said write compensator detects a data bit string in which a number of continuous bits "0" in a preceding direction with respect to a reference bit "1" is different from a number of continuous bits "0" in a following direction with respect to said reference bit "1" for each predetermined number of bits of said data signal based on the relationship between bit shift which is beyond an allowable range and said data bit string of said data signal, it executes write compensation with respect to said data signal indicative of said detected data bit string so as to suppress said bit shift in said allowable range.

8. The disk drive according to claim 7,
wherein, when, as a data pattern of said data bit string, a data pattern having a maximum frequency is determined as a 1T pattern, and when said write compensator detects a data pattern which differs in a preceding direction and a following direction with respect to a reference bit "1" of said data signal, it performs write compensation with respect to said data signal indicative of said detected data pattern so as to suppress said bit shift in an allowable range.

9. A method of write compensation for perpendicular magnetic recording of a data signal on a disk by a write head in a disk drive having a magnetic head that includes the write head and a read head, said method comprising:

holding a data bit string for a predetermined number of bits of a data signal when recording said data signal on said disk;

detecting a data bit string in which bit shift occurs beyond an allowable range, said detecting based on a predetermined relationship between bit shift caused by a distortion of a read signal waveform from said read head and a data bit string of said data signal; and executing write compensation with respect to said data signal indicative of said data bit string in order to suppress said bit shift.

10. The method of claim 9, further comprising:
converting said write-compensated data signal into an electrical signal and supplying it to said write head.

11. The method of claim 9, wherein, with a bit "1" of said data signal being determined as a reference, a data bit string at each bit interval corresponding to a number of continuous bits "0" is detected, and wherein said write compensation is performed when, in said detected data bit string, said bit interval is a data bit string that exceeds a preset reference value.

12. The method of claim 9, further comprising:
determining a bit "1" of said data signal as a reference, and performing write compensation when a bit interval corresponding to a number of continuous bits "0" in either a preceding or following direction is a data bit string that exceeds said reference value; and determining a bit shift direction in said write compensation in accordance with either said preceding or following direction.

13. The method of claim 9, further comprising:
performing said write compensation with respect to a data signal indicative of a data bit string equal to or above a 3T pattern when, as a data pattern of said data bit string, a data pattern having a maximum frequency is determined as a 1T pattern.

14. The method of claim 9, wherein when a data bit string in which a number of continuous bits "0" in a preceding direction with respect to a reference bit "1" is different from a number of continuous bits "0" in a following direction with respect to said reference bit "1" is detected for each predetermined number of bits of said data signal based on the relationship between bit shift beyond an allowable range and said data bit string of said data signal, write compensation is performed with respect to said data signal indicative of said detected data bit string so as to suppress said bit shift in said allowable range.

15. The method of claim 9, wherein when a data bit string in which a number of continuous bits "0" in a preceding direction with respect to a reference bit "1" is different from a number of continuous bits "0" in a following direction with respect to said reference bit "1" is detected for each predetermined number of bits of said data signal based on the relationship between bit shift beyond an allowable range and said data bit string of said data signal, write compensation is performed with respect to said data signal indicative of said detected data bit string so as to suppress said bit shift in said allowable range.

* * * * *